Patented Apr. 20, 1926.

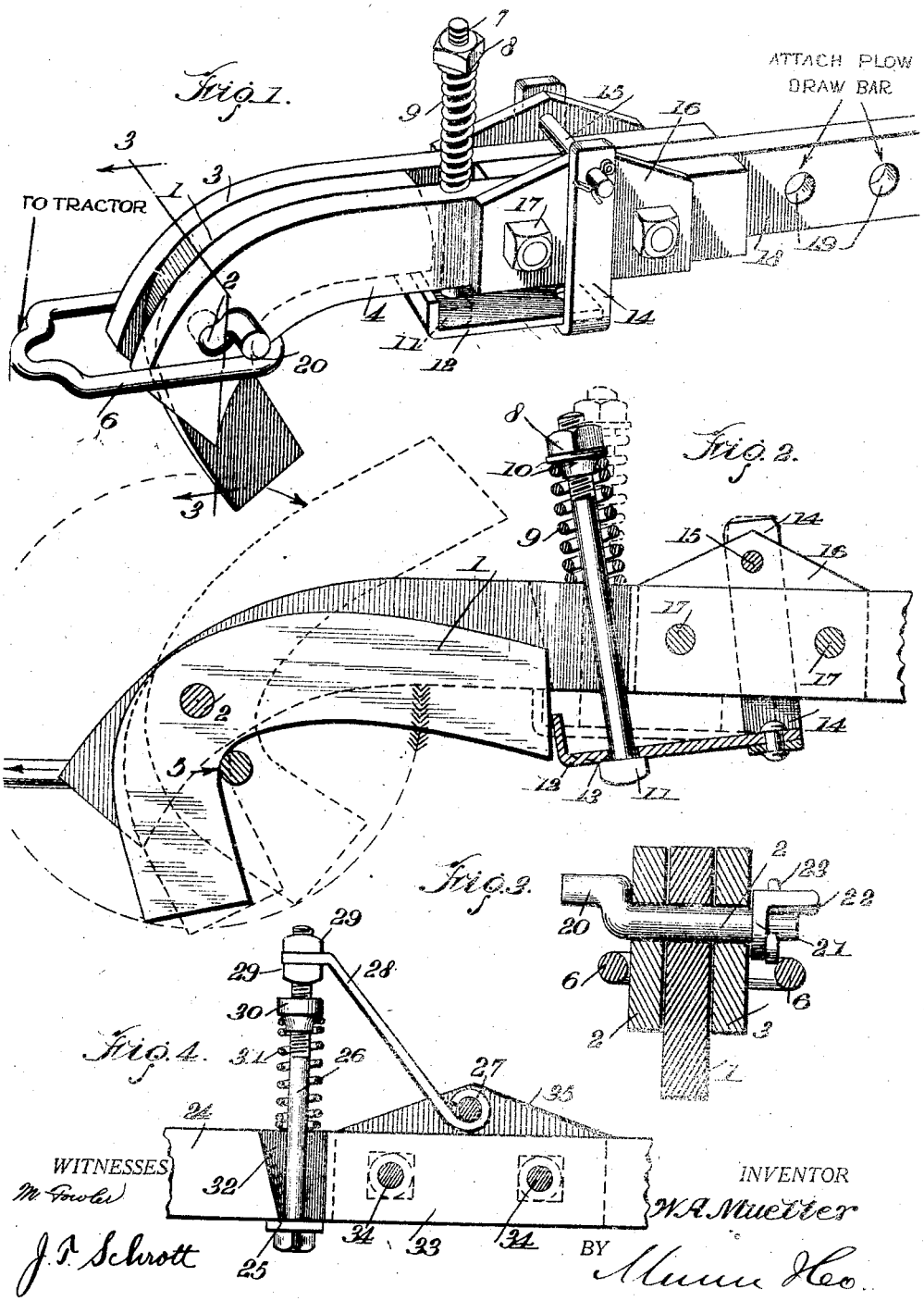

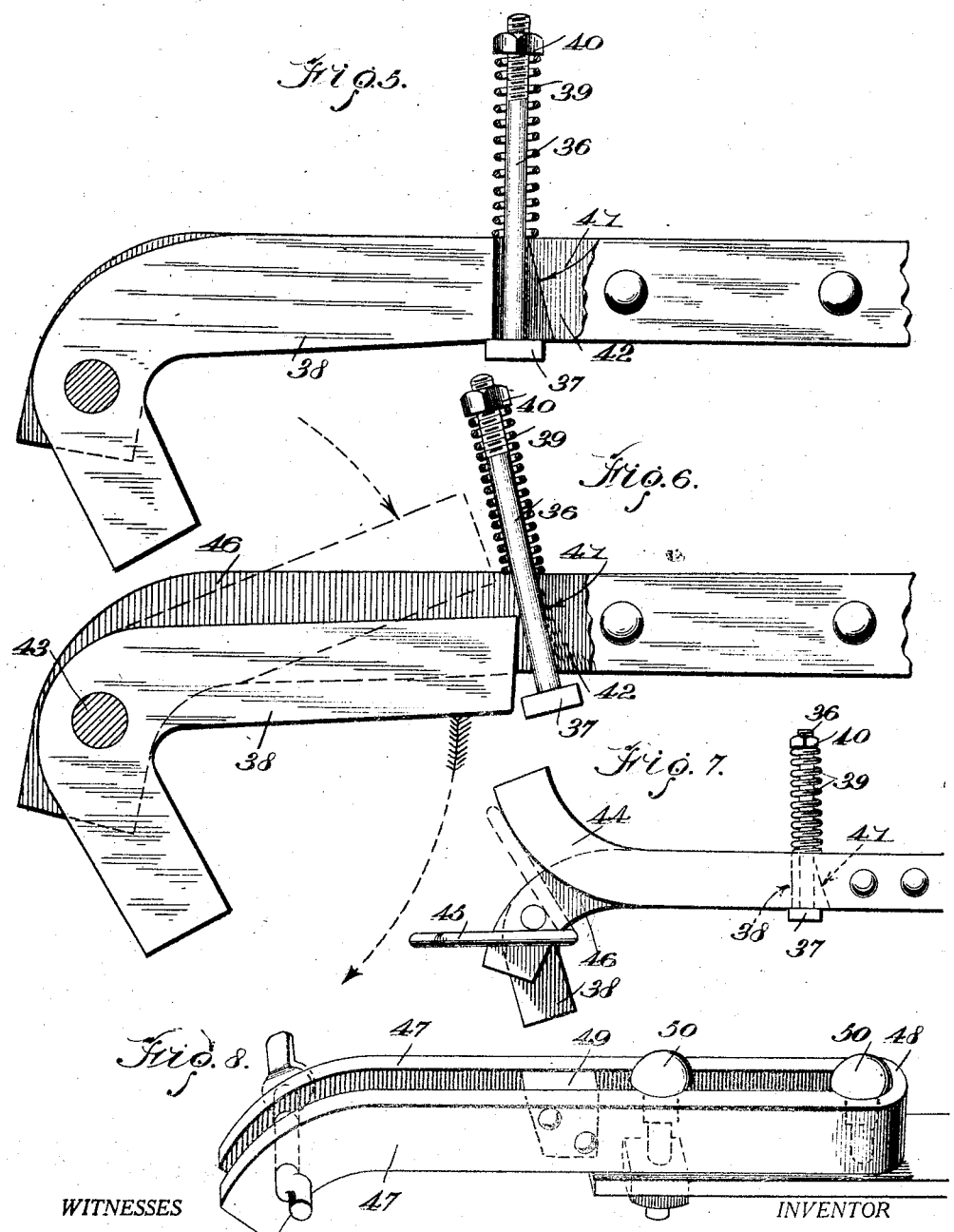

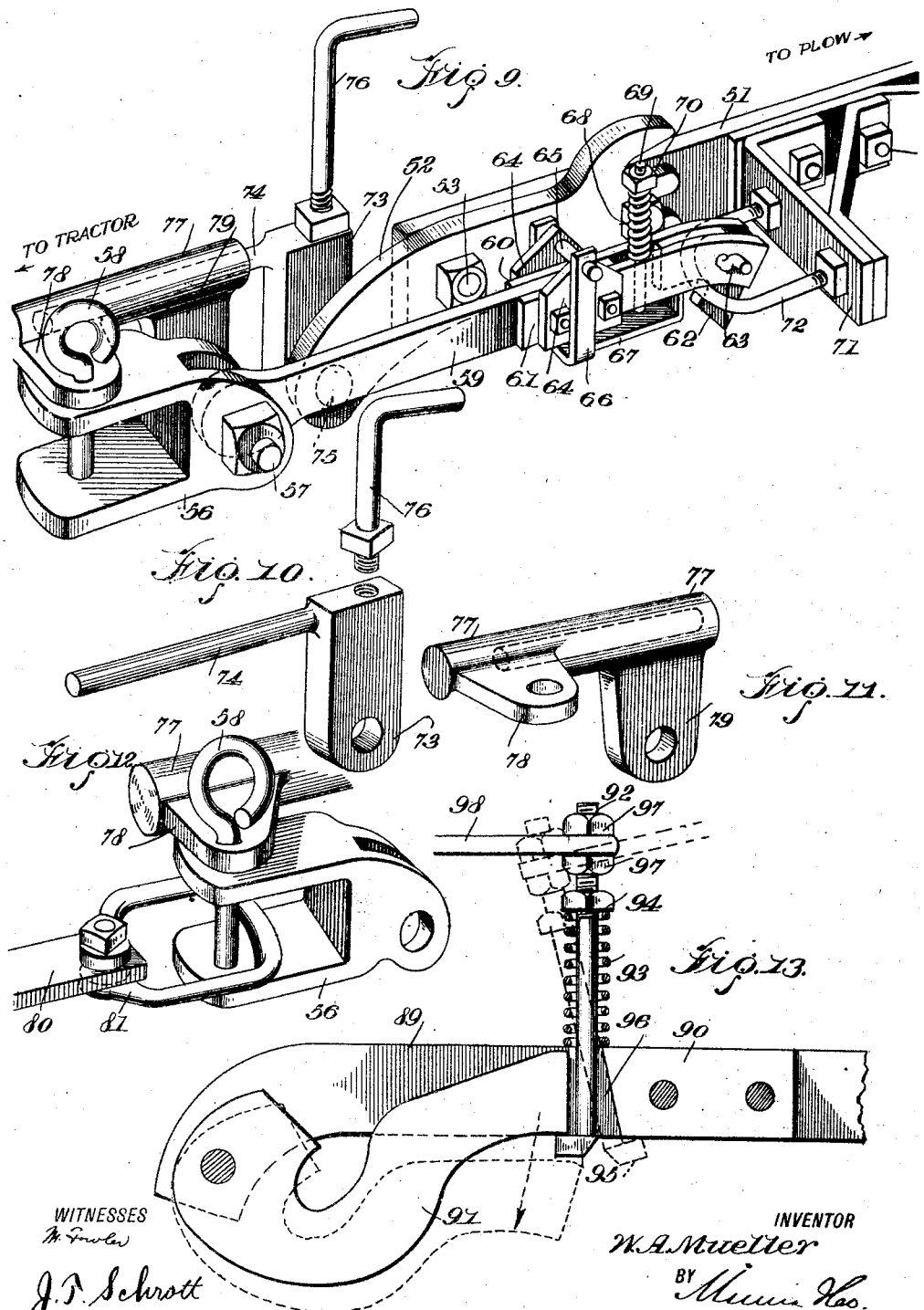

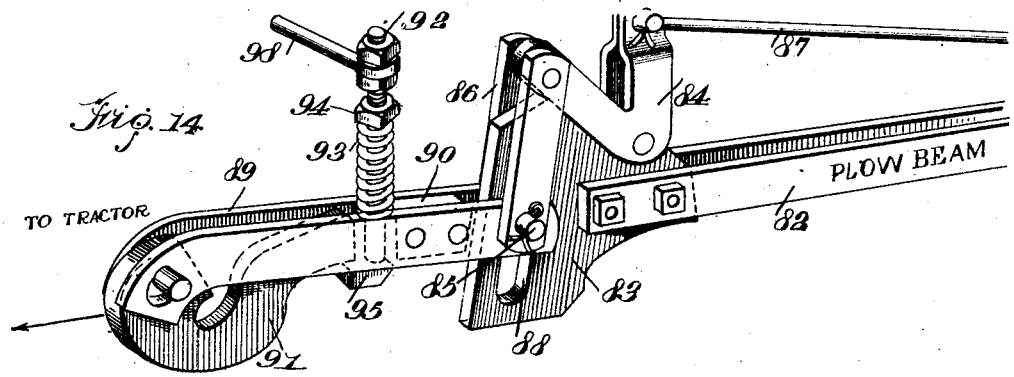
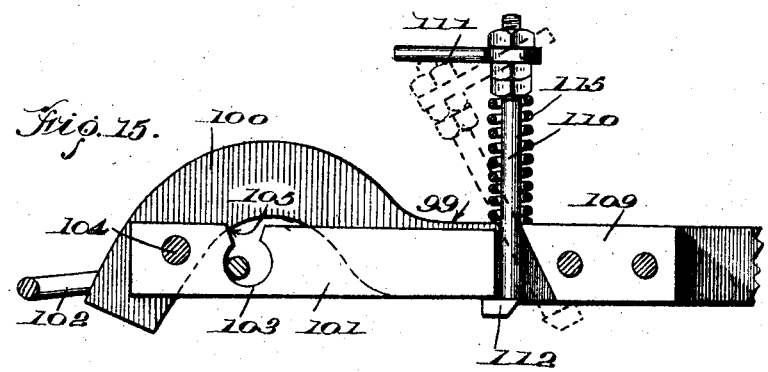

1,581,467

UNITED STATES PATENT OFFICE.

WILLIAM ANTON MUELLER, OF ABERDEEN, SOUTH DAKOTA.

AUTOMATIC RELEASE COUPLING.

Application filed July 26, 1923. Serial No. 654,000.

*To all whom it may concern:*

Be it known that I, WILLIAM ANTON MUELLER, a citizen of the United States, and a resident of Aberdeen, in the county of Brown and State of South Dakota, have invented certain new and useful Improvements in Automatic Release Couplings, of which the following is a specification.

My invention relates to improvements in couplings adapted for use in agricultural pursuits and it consists of the constructions, combinations and arrangements herein described and claimed.

An object of the invention is to provide a coupling to be used between a tractor and a plow which coupling is made in such a way that it will automatically release the tractor should the plow present abnormal resistance as in instances when it becomes stuck.

Another object of the invention is to provide an automatic release coupling for the purpose described having a dog which is adapted to make a complete revolution upon becoming released, and at the end of said revolution occupy a re-set position.

Other objects and advantages will appear in the following specification, reference being had to the accompanying drawings, in which:—

Fig. 1 is a perspective view illustrating a typical form of the automatic release coupling, Fig. 2 is a longitudinal section of Fig. 1, parts being in elevation, illustrating the action when the dog is released by the latch and also illustrating how the dog turns back to the original position at the end of the revolution aforesaid, Fig. 3 is a detail cross section taken on the line 3—3 of Fig. 1 and showing the peculiar construction of the pivot pin, Fig. 4 is a longitudinal section, partly in elevation, illustrating a modification of the coupling, Fig. 5 is a longitudinal section of another modification of the coupling wherein the head of the latch bolt engages the dog, Fig. 6 is a similar view illustrating the action upon the release of the dog, Fig. 7 is a detail side elevation of a further modification involving the use of a horn to prevent the pulling link from moving back over the side arms, Fig. 8 is a perspective view of a modification in the construction of the side arms, illustrating an arrangement by which the side arms are applicable to almost any form of draw bar, Fig. 9 is a perspective view illustrating the adaptation of the invention to a coupling between a tractor and an Oliver No. 7 plow, Fig. 10 is a detail perspective view of the telescopic pin, Fig. 11 is a detail perspective view of the sleeve in which said pin telescopes, Fig. 12 is a detail perspective view showing how the pull link of the tractor attaches to the clevis in Fig. 9, Fig. 13 is a longitudinal section illustrating another modification in which the latch bolt may be turned to release the dog.

Fig. 14 is a perspective view of the modification in Fig. 13 showing how it will be attached to the hitch of the John Deere No. 40 plow, Fig. 15 is a longitudinal section of another modification of the coupling illustrating the use of gooseneck side arms and a straight dog, Fig. 16 is a view similar to Fig. 15, illustrating a further modification in the disposition of the pull link opening in the dog, Fig. 17 is a detail perspective view of the latch bolt as used in Figs. 13 to 15, Fig. 18 is a perspective view of the latch bolt as used in Fig. 16, and Fig. 19 is a detail view of a further modification of the dog.

It will be obvious to the reader from the foregoing brief descriptions of the views in the drawings, that the object of the invention is carried out by a variety of types of the automatic coupling. The various modifications are presented in order to show how the coupling is adaptable to various forms of plow draw bars and how the dog may be released in various ways and still preserve the identity of the invention. In order to keep the various constructions separate they are described in the order that they appear in the drawings.

The modification in Figs. 1 to 3 illustrates the use of a dog 1 which is pivoted on a pin 2 between side arms 3 and 4. The dog 1 is bent in a somewhat peculiar manner, as shown in Fig. 2. It is of a distorted U-shape, and when operatively mounted on the pivot pin 2, the arrangement is such that the curve 5 at which the pull occurs, is situated at a point below the pivot.

The link 6 is intended to attach to a tractor or other available pulling power, and when the pull occurs (Fig. 2) the short end of the dog tends to move forward, while the long end tends to swing downward. This downward moving tendency is checked by suitable holding means in order that the dog may not be released in ordinary operation. However, this holding means is so arranged that it will release the dog on occasions when the plow, to which the reader may suppose the coupling to be attached, is put under such an unusual strain that there is danger of breaking some other part.

This holding means consists of a bolt 7 to the threaded upper end of which a nut 8 is applied for the purpose of furnishing an abutment for the spring 9. The spring 9 engages the top of the side arms 3 and 4 at one end and at the other end rests against a sleeve 10 which is suitably formed to receive it. The sleeve 10, like the nut 8, may be adjustable on the threads of the bolt, or it may be loose, as may be desired. The function of the spring 9 is to draw upward on the head 11 of the bolt.

In the case now under consideration, the upward pressing tendency of the spring 9 moves a latch 12 against the under side of the side arms 3 and 4. This latch has a hole 13 through which the bolt 7 extends. It is beneath the latch that the head 11 has engagement. The latch includes links 14 which extend up on each side of the side arms and have rocking support on a shaft 15 which in turn is carried by brackets 16.

These brackets are secured by the same bolts 17 which hold the side arms 3 and 4 and the spacer bar 18 together. The spacer bar may be made in any one of a number of ways. In the present instance it extends out at the back of the side arms and has several openings 19 providing convenient places where the draw bar of a plow may be attached. The strength of the extended part of the spacer may be such as to accommodate the different plow draw bar constructions.

In practice, the spring 9 is intended to be quite strong, in fact, strong enough to resist the downward moving tendency of the dog 1 against the latch 12. The spring 9 is therefore strong enough to withstand the ordinary or normal pulling pressure by which the plow or other implement is drawn forwardly over the ground. Now, should the plow or other implement stick and thus call for the exercise of abnormal pulling power on the part of the tractor or other pulling agent, the spring 9 will yield so that the latch 12 moves down and permits the release of the dog 1. This release will cause the dog 1 to spin around in the direction of the arrow (Fig. 2). The dog will make a complete revolution. In the meantime, the latch 12 will spring back to the original position in readiness to receive the dog, when it spins round to the normal position. The dog is then in readiness to again receive the link 6 when ordinary conditions are restored.

It is to be observed that the pivot pins 2 have provisions for keeping the link 6 from slipping back over the side arms 3 and 4. At one end the pivot pin 2 has an offset 20. The other end of the pin is straight (Fig. 3) but is provided with a rocker 21 which has a projection 22 at one side serving the same purpose as the offset 20. The rocker 21 is held in place by a cotter pin 23. The reader can readily see that the offset 20 and projection 22 will readily keep the link 6 from slipping.

The modification in Fig. 4 is closely related to the foregoing modification. Only so much of the dog 24 is shown as is necessary to show how it engages the head 25 of the latch bolt 26. Instead of using the shaft 27 as a mounting for links, as in Fig. 1, it is used as the mounting for a plate 28 which extends up between a pair of lock nuts 29 by means of which the bolt 26 and the plate 28 are secured together. The bolt 26 and the plate 28 are therefore integral and constitute the equivalent of the latch 12 in Fig. 1.

The bolt 26 carries a sleeve 30 against which one end of the spring 31 bears. The other end of the spring bears against the top of the side arms, of which only the one 32 may be seen at the back of the bolt in Fig. 4. The spacing necessary for the swinging of the dog 24 between the side arms is preserved by a bar 33 which, like the bar 18 in Fig. 1, is secured by bolts 34 which also hold the latch brackets 35 in place. Excessive downward pressure on the dog 24 in the direction of the arrow will cause the displacement of the latch 25 against the tension of the spring 31, whereupon the dog is released and may swing around in a circle, as suggested in Fig. 2, until re-engagement is had.

The modification in Figs. 5 to 7 shows how the functions of a latch may be preserved without actually employing a latch, as is done in Figs. 2 and 4. Here, the latch bolt 36 has a head 37 which supports the long arm of the dog 38 during ordinary operating circumstances such as mentioned before. The latch bolt is sustained by a spring 39 which in turn presses against a nut 40 on the threaded end of the bolt. The nut is adapted to increase or diminish the tension of the spring 39 upon occasions.

A distinction is to be noted between the shape of the end of the dog in Fig. 5 and in the foregoing modification. In the latter instances the end of the dog is beveled, whereas in Figs. 5 and 6, the end is straight. Reference is now being made to that end of the dog which comes next to the latch. But instead of making the confronting end of the spacer straight as in the foregoing modifications, this end is now beveled at 41. The purpose of this is obvious enough in Figs. 5 and 6.

Upon the occurrence of a pressure on the dog 38, which is greater than the spring 39 will bear, the spring will be depressed as the latch bolt 36 moves down and to one side by virtue of the pressure on the head 37. The latch bolt now takes a position against the beveled side 41 of the spacer 42 and leaves an ample passageway for the dog. The dog now swings around on the pivot 43 as before, and returns to the original resting position against the head 37 of the latch. In Fig. 2, the end of the dog must be beveled in order that it may pass the end of the latch plate 12 when in the position shown in Fig. 2.

In Fig. 7, use is made of a horn 44 for the purpose of preventing the pulling link 45 from playing or slipping back over the side arms 46. This horn is the equivalent of the offset 20 and the projection 22 in Fig. 3 in so far as function is concerned. The horn consists of nothing more than a piece of suitably shaped, perhaps bent, metal, applied to the sides of the arms 46 in the most convenient manner, and in such a position as to intercept the link 45 should it for any cause exhibit a tendency to fly back.

The modification in Fig. 8 illustrates an arrangement by means of which the coupling may be readily applied to a wide variety of draw bars. This modification deals mainly with the form of the side arms. Instead of making these separate, as in the preceding modifications, they now appear in the shape of parallel members 47 which are part of a bar which has been bent or beveled at 48. The distance between the side arms 47 is preserved by a spacer 49, which may be either of the shape disclosed in Figs. 5 and 6 or as in Fig. 1. The style of pivot pin shown is that of the pivot pin in the first modification. The dog is omitted, inasmuch as use may be made of the dog in any one of the modifications. Bolts 50 secure the one-piece side arms on top of the draw bar of a plow or other implement to be drawn.

The modification in Figs. 9 to 12 is especially adapted for use with a plow now on the market known as the Oliver No. 7. The clevis 56 is separated at the usual place of connection with the draw plate 52 and the bolt 57 which formerly made the connection is now used to attach the clevis to a link 59 which may be regarded as the equivalent of the part 18 in Fig. 1, 42 in Fig. 5 and 49 in Fig. 8, inasmuch as it serves as a spacer between the side arms 60 and 61. The spacing between these side arms is necessary for the proper working of the dog 62, as before.

The dog has pivotal mounting between the side arms on a fulcrum pin 63 which may be similar to the fulcrum pin 2 of Fig. 1. Brackets 64 support the shaft 65 on which the links 66 and the latch 67 are pivoted. The latch is held up by the spring 68 on the latch bolt 69 which, like the bolt 7 in Fig. 1, has an adjustable nut 70 by means of which the tension of the spring may be varied.

Mounted on the side of the plow beam or draw bar 51 is an outstanding bracket 71 to which a link 72 is fixedly connected. This link is in fact a U-bolt, and in one respect it may be regarded as the equivalent of the link 6 in Fig. 1 inasmuch as it engages the dog and is adapted to be released therefrom. The distinction between the arrangement in Figs. 9 and 1 lies in the fact that in Fig. 9, the link 72 is carried by the plow whereas in Fig. 1 the link is carried by the tractor.

However, in both cases, the link exerts a pull against the dog and the principle of operation is therefore the same. Mention has been made of the fact that the draw plate 52 and clevis 56 are separated in Fig. 9. It is now necessary to support the draw plate and consequently the plow beam. This is accomplished by attaching the plate 73 of a pin 74 to the now free end of the draw plate. A rivet or bolt 75 is used for the purpose. The plate 73 has a handle 76 by means of which the plow beam may more readily be lifted and by which the pin 74 may be inserted in the sleeve 77.

This sleeve has an ear 78 through which the pin 58 is inserted. Connection with the tractor or pulling power is made at the pin 58. The sleeve also has a vertical ear 79 through which the pivot bolt 57 passes so as to complete the attachment of the sleeve to the clevis. The pin 74 has telescopic engagement with the sleeve.

Upon the occurrence of a resistance at the plow greater than the spring 68 will support, the spring gives way so that the dog 62 rocks on its fulcrum 63 and releases the link 72. The telescopic pin 74 withdraws from the sleeve 77, and when connections are re-established the handle 76 is used to guide the pin back into the sleeve 77. The dog 62 is adapted to make a complete revolution as before, until the long end re-engages the latch 67 in readiness to again receive the link 72.

Fig. 12 illustrates one form of connection of the clevis 56 with the tractor. The draw bar 80 is a part of the tractor to which the pull link 81 is attached. The pin 58 passes through both the horizontal ear 78 of the sleeve 77 and the clevis, the link 81 being held in the clevis by the pin.

The modification in Figs. 13 and 14 illustrates an arrangement of the coupling which is particularly adaptable to a plow known on the market as the John Deere No. 40. The beam 82 (Fig. 14) of this plow has a plate 83 attached thereto for the purposes of furnishing a pivotal mounting for the bell crank 84 and a guide for the clevis bolt 85. This bolt is carried by links 86 which are suspended from one arm of the bell crank. The other arm of the bell crank has a rod 87 connected thereto so that by rocking the bell crank the clevis bolt 85 may be adjusted up and down in the slot 88 in the plate 83.

In order to apply the invention, use is made of the clevis bolt 85 as a support for the side arms 89 which are held apart by a spacer 90 so that both the dog 91 and the latch bolt 92 may have ample room to work freely. The reader will understand that the automatic coupling is capable of being adjusted up and down with the clevis bolt 85 by means of the bell crank and connecting rod.

A spring 93 engages a nut 94 on the bolt 92 at one end and the upper edge of the side arms at the other end. This keeps the head 95 in engagement with the under side of the side arms so as to support the dog 91. In operation, the modification in Figs. 13 and 14 is much like that of the coupling in any of the other forms of the invention. The spring 93 will sustain the dog 91 until the dog is put under a strain greater than the spring will stand. Thereupon the spring will give, permitting the dog to move down to the released position. In order that there may be ample room for the passage of the dog, the forward end of the spacer 90 is beveled at 96.

However, the latch in Figs. 13 and 14 is capable of another mode of operation. Fastened between nuts 97 near the extremity of the bolt 92, is a handle 98. This handle is to be used in the event that it is desired to manually disengage the dog 91. In such event, the handle 98 has only to be turned so as to move the head 95 out of the path of the dog, whereupon the dog will be released. In addition to turning the handle and the latch bolt, the latter may be inclined to the dotted line position against the beveled front edge of the spacer 90 so as to provide ample room for the passage of the dog. It is preferable that the handle 98 extend off to one side as shown in Fig. 14, so as to be out of the way in cases when the dog 91 releases automatically.

The modifications in Figs. 15 and 16 are so much alike that they may be described together. The main difference between these forms and those preceding is that the side arms 99 are formed with a gooseneck 100 and the dog 101 is made straight instead of according to the peculiar curved formation in the various other modifications. The gooseneck 100 is necessary to provide the space for the connection of the pull link 102 with the opening 103 in the dog. This opening is so arranged that the line of pull becomes below the pivot 104. The opening 103 has an entrance 105 at the top. In Fig. 16, the entrance 106 occurs below the opening 107 but nevertheless, the arrangement is such that the pull comes below the pivot 108.

Spacers 109 are made use of in both forms of the invention. The latch bolts 110 are alike so far as the provision of handles 111 is concerned, but there is a slight difference between the latch head 112 of the modification in Fig. 15 and the head 113 in Fig. 16.

Figs. 17 and 18 illustrate the respective differences more clearly. The head 112 is rather thick and joins immediately with the bolt 110. The head 113 is rather thin and is cut away at the back at 114 so that the place of connection is somewhat on a bias. In both cases, a spring 115 holds the latch head up underneath of the side arms to thereby sustain the dog 101 until such an unusual pull occurs that the spring 115 must give way.

The release of the dog 101 may either be automatic or manual. The handles 111 are turned off to one side so that the swinging of the dog may not be interfered with in the automatic release. Should it be desired to manually disengage the dog the handle 111 may be turned in either instance to the position shown in dotted lines in Fig. 15.

The operation may be briefly reviewed to advantage: All of the forms of the invention make use of a pivoted dog upon which a pull or pressure is exerted in the operation of drawing a plow by means of a tractor. The dog forms the connecting link between the two, and as long as the dog remains in what may be regarded a normal position, the connection between tractor and plow is sustained.

It frequently happens that a plow will become stuck, as for example in striking a boulder, stump, etc., whereupon the tendency of the tractor is to pull so hard on the plow that some of the parts may break. The dog is therefore so arranged that it will release when an abnormal pressure occurs. This release is accomplished automatically and by means of a spring latch which consists either of the pivoted members 12 and 67 in Figs. 1 and 9 respectively, or of the simple latch bolt as shown in Figs. 4, 5, 13 and 15.

In all cases, the dog latch is held up by a spring. The power of this spring is great enough to withstand ordinary pulls on the dog which it supports. When the pull on the dog becomes excessive, the spring gives way, lets the latch down and thus releases the dog so as to drop the plow. A brief description of Fig. 1 will perhaps be typical of the operation of all of the forms.

In Fig. 1, the pull of the link 6 occurs at a point below the pivot 2 of the dog 1. The long arm of the dog is supported by the latch 12 as long as the pull on the dog does not exceed the tension of the spring 9 which supports the latch. This spring bears on top of the side arms 3 and 4 and sustains the bolt 7 which has connection with the latch. As soon as the pulling power exceeds the strength of the spring, the latch will move to the full line position in Fig. 2 at which time the dog is released and may swing to make a complete revolution as suggested by the dotted lines, in readiness to re-engage the latch 12 which supposedly has been restored to the former and dotted line position by the spring 9.

The foregoing typical description of the operation of the automatic coupling may well be supplemented by a brief description of the arrangement in Fig. 9 inasmuch as this introduces elements not shown in any of the other modifications. The draw plate 52 and clevis 56 are original parts of an Oliver No. 7 plow. In order to adapt this particular plow to the automatic coupling, the clevis 56 is separated from the original draw plate and the corresponding connection is made by means of a sleeve 77 and pin 74. The elements of which the sleeve and pin are parts are respectively connected to the clevis and to the draw plate and when the moment comes for the separation of the plow from the tractor, the pin 74 and sleeve 77 separate so as to let the plow drop. The telescopic connection of the pin with the sleeve is necessary in order to sustain the draw plate and draw bar 51 so that all of the weight does not come on the link 59 or the side arms 60 and 61, neither of which are capable of any supporting function.

The reader will recognize the connection of the dog 62 with the link 72 as being typical of all of the forms of the invention. When the pull between the dog and link becomes excessive the spring 68 will yield, permitting the latch 67 to lower and thus release the dog. It is at this time that the pin 74 separates from the sleeve 77, the plow then halting while the tractor momentarily proceeds. The dog 62 is intended to spin around to the original engaging position with the latch 67 in readiness to again make connection with the link 72 when the tractor is backed up and the pin 74 is re-inserted in the sleeve 77. The handle 76 aids this insertion.

Before concluding, attention is directed to Fig. 19. The dog 116, here shown, is substantially like the dog shown in Figs. 1 and 5 and its functions in respect to the pull link 117 are the same. However, the idea of the horn 44 in Fig. 7, is now incorporated in the dog itself. The horn 118 is made integral with the dog 116 and stands out far enough beyond the pivot of the dog to prevent the link 117 slipping back over.

While the construction and arrangement of the improved automatic coupling as herein described and claimed, is that of a generally preferred form, obviously modifications and changes may be made without departing from the spirit of the invention or the scope of the claims.

I claim:—

1. A coupling comprising spaced side arms, a dog pivoted upon the side arms, a latch located along one edge of the side arms having links extending toward the other edge of the side arms, a pivotal mounting for said links at said edge, a bolt passing through the latch and the space between the side arms, and a spring carried by the bolt exerting pressure thereon and upon the adjacent edge of the side arms to keep the latch in engagement with the under side of the side arms in position to sustain the dog.

2. A coupling comprising a side arm, a dog pivoted thereupon, a pulling link which embraces the side arm and a portion of the dog beneath the pivot, and means residing in the end structure of the pivot to prevent the link slipping back beyond the pivot.

3. A coupling comprising a pair of side arms, a dog pivoted between the side arms, a pin by which the dog is pivoted therebetween, a link embracing the side arms and engaging the dog beneath the pivot pin, and means to prevent the link slipping back beyond the pivot and over the side arms comprising an offset on one end of the pin and a washer having a projection on the other end of the pin.

4. A coupling comprising a pair of side arms, a dog pivoted between the side arms, a pin by which the dog is pivoted therebetween, a link embracing the side arms and engaging the dog beneath the pivot pin, and means to prevent the link slipping back beyond the pivot and over the side arms comprising an offset on one end of the pin and a washer having a projection on the other end of the pin, said means comprising side pieces forming a horn.

5. In combination with a clevis, plow beam and draw plate, a bracket attached to the plow beam having a link, a coupling connected between the clevis and the link including a dog with which the link has engagement, means attached between the draw plate and the clevis to sustain the plow beam on the clevis independently of the coupling and link, and means for preserving a predetermined position of the dog in respect to the link until the tension between the dog and link becomes excessive by virtue of the pull at the clevis thereupon releasing the dog to drop the plow beam.

6. In combination with a clevis, plow beam and draw plate, a bracket carried by the plow beam and having a link, a link extending from the clevis carrying a dog with which the link engages, means carried by the draw plate for sustaining the plow beam on the clevis including a pin carried by the draw plate and a sleeve carried by the clevis said parts being in telescopic engagement, a latch for sustaining the dog while the plow is being drawn at the clevis, and a spring for sustaining the latch until the pull preponderates the tension of the spring whereupon the dog is released to drop the link and plow beam, said pin thereupon disengaging from the sleeve.

7. A coupling comprising a pair of arms, means fastened between the arms to space them at one end, a dog permanently pivoted between the arms to space them at the other end, one end each of the dog and spacing means defining a narrow passage between the arms, means for supporting said end of the dog including a bolt situated in and operable through the passage, said bolt having a supporting head, and resilient means tending to pull the bolt head through the passage.

8. A coupling comprising an arm attachable to a vehicle to be drawn, a dog pivoted upon the arm, a bracket mounted upon the arm, means constituting a dog-supporting latch permanently rockable upon the bracket, resilient means for holding the latch in a supporting position, and means by which the influence of the resilient means is transferred to the latch.

9. A coupling comprising a pair of arms, means fastened between the arms to space them at one end, a dog permanently pivoted between the arms to space them at the other end, means constituting a bracket held in place by the fastening means of the first spacing means, rockably mounted means carried by the bracket for supporting one end of the dog, a bolt carried by said rockable means extending through the space between the arms, abuttable means carried by the free end of the bolt and resilient means interposed between said abuttable means and the arms.

10. In combination with a clevis, plow beam and draw plate, coupling means connecting the clevis and plow beam, and means connecting the clevis with the draw plate to sustain the plow beam on the clevis independently of said coupling means.

11. In combination with a clevis, plow beam and draw plate, a separable coupling between the clevis and the plow beam, and telescopically connected means carried by the clevis and draw plate to sustain the plow beam on the clevis independently of said coupling means.

WILLIAM ANTON MUELLER.